J. R. KELLEY.
ELECTROLYTIC INTERRUPTER.
APPLICATION FILED MAR. 19, 1912.
1,138,761.
Patented May 11, 1915.
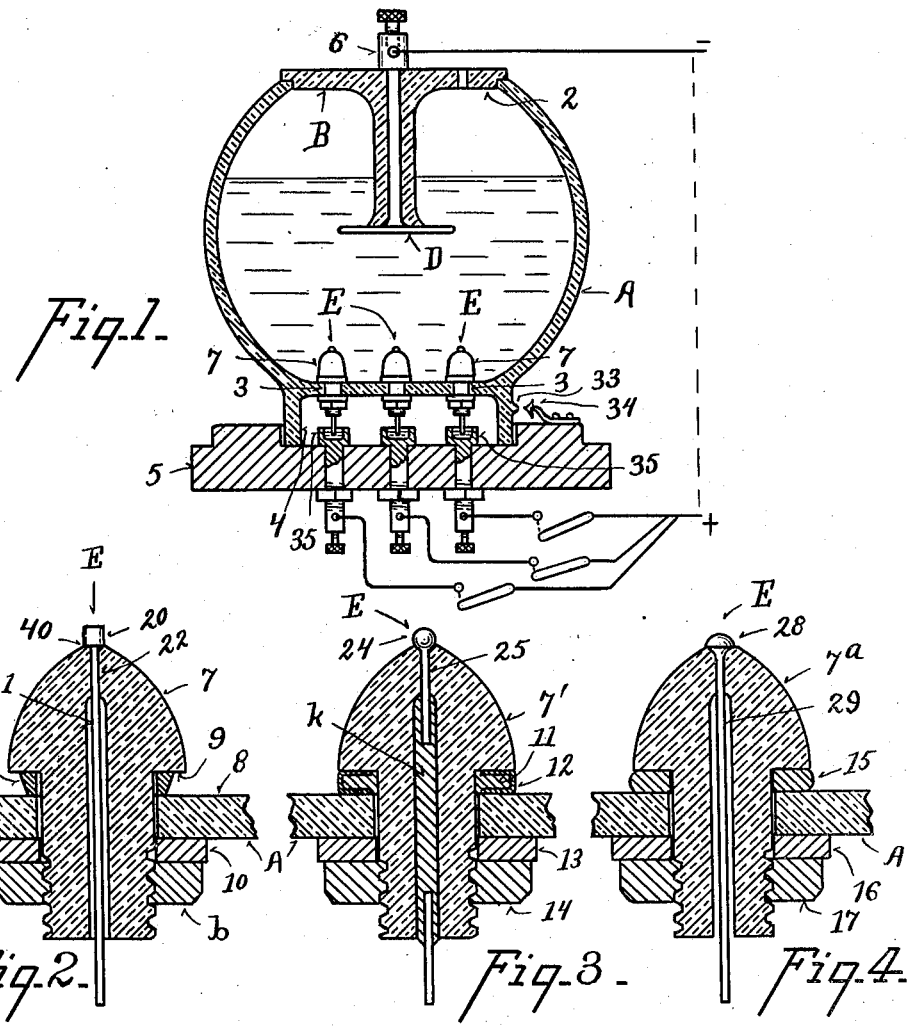
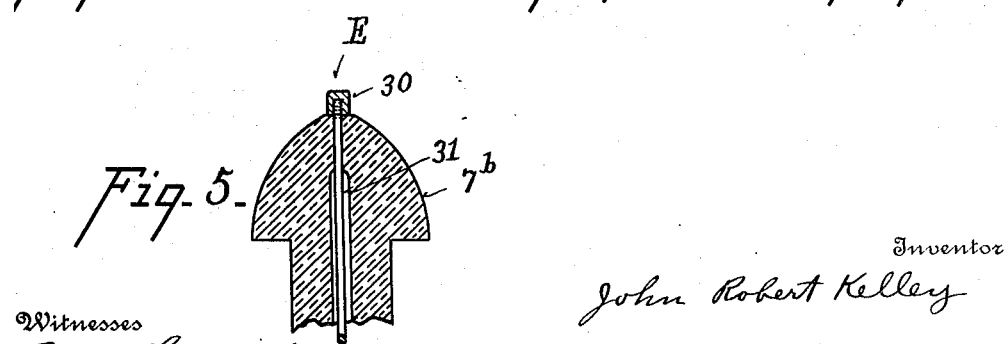
Witnesses
Inventor
John Robert Kelley
By C. W. Mills.
Attorney

UNITED STATES PATENT OFFICE.

JOHN ROBERT KELLEY, OF COVINGTON, KENTUCKY.

ELECTROLYTIC INTERRUPTER.

1,138,761.  Specification of Letters Patent.  Patented May 11, 1915.

Application filed March 19, 1912. Serial No. 684,889.

*To all whom it may concern:*

Be it known that I, JOHN ROBERT KELLEY, a citizen of the United States, residing at Covington, in the county of Kenton and State of Kentucky, have invented certain new and useful Improvements in Electrolytic Interrupters, of which the following is a specification.

My invention relates to electrolytic interrupters. One of its objects is to provide an improved cell for electrolytic interrupters.

Another object is to provide an improved interrupting electrode and means for mounting the same.

Another object is to provide an interrupting electrode of improved form and proportions to provide for regular, sharp, and uniform interruptions to prevent excessive heating of said electrode, and to provide for a general or uniform regular and sudden release or disengagement of gaseous products from the interrupter electrode.

Another object is to prevent corrosive action at the interrupter electrode or its insulating and supporting member.

My invention further comprises certain details of form, combination and arrangement, all of which will be fully set forth in the description of the accompanying drawings, in which:

Figure 1 is a central vertical section through an electrolytic cell embodying my improvements. Fig. 2 is an enlarged sectional detail through one form of interrupter electrode and its supporting member. Figs. 3, 4, and 5 are views similar to Fig. 2 illustrating modifications of the interrupter electrode and its mounting.

The accompanying drawings illustrate the preferred embodiments of my invention.

A represents a cell preferably of glass having an opening 2 at the top and a series of openings or perforations 3 at the bottom, and preferably a downwardly projecting rim 4 or a series of feet to hold the main portion of the bottom free from its supporting member.

B represents a lid to cover the opening at the top of the cell, and D an electrode preferably of lead exposing a considerable surface area to the electrolyte, and with its stem fused or sealed in the material of the lid B to protect it from contact with the electrolyte. The face of electrode D in contact with the electrolyte is preferably directed downwardly, and said electrode connected up by wire as the negative electrode of the cell, by means of a binding post 6 at the top of the lid B.

I preferably provide a plurality of interrupter electrodes E which are mounted in stems or supporting members 7 of non-conducting material, preferably porcelain. Said supporting members are separately mounted in the perforations 3 through the bottom of the cell wall. The respective electrodes E are preferably connected by separate switch controlled branch wires to a positive line or end of the circuit. By switching one interrupter electrode into circuit a small volume of interrupted current will pass through the cell, and by switching into circuit several interrupter electrodes at one time, an interrupted current of increased volume will pass through the cell, hence the volume can be controlled by the number of interrupter electrodes in circuit.

I have illustrated several modifications of means for mounting or securing the interrupter electrode supporting members or stems in position in the perforations 3 to secure reliable joints not liable to leak, and permitting removal and replacing of the interrupter electrodes if required. As illustrated in Fig. 2 a lead or soft metal ring or washer $a$ is interposed between the inner cell wall 8 and the shoulder 9 of the member 7, and preferably one of the bearing surfaces of said washer $a$ is of reduced area so as to cause the metal of the washer to yield and make a close joint with the unyielding material of the cell or member 7 before the clamping nut $b$ exerts sufficient strain on the other parts to either part the material of member 7 or to fracture the material of the cell wall. A soft rubber ring or washer 10 is employed against the outer face of the cell wall, and preferably a hard rubber or fiber nut $b$ engaging threads molded in the periphery of the lower end of member 7.

As illustrated in Fig. 3 a soft rubber ring 11 is partly incased in an annular sheathing 12 of lead or other soft metal to hold the rubber in place and prevent it from spreading outwardly under pressure. A soft rubber ring 13 and nut 14 are employed on the outside of the cell wall.

As illustrated in Fig. 4 a plain soft rubber or composition ring or washer 15 is employed against the inner face of the cell wall, with a soft rubber or composition washer 16 and nut 17 against the outer face of the cell wall.

With interrupter electrodes as heretofore employed there is a tendency at that portion of the interrupter electrodes exposed to the electrolyte, and also the insulating or supporting member adjacent thereto to disintegrate or corrode. There is also a tendency to irregular or local action between the surface of the interrupter electrode and the electrolyte, resulting in only partial interruptions or interruptions which are not sudden or sharp, and also a tendency to excessive heating at the interrupter electrodes. In order to avoid these objectionable tendencies I provide upwardly facing interrupter electrodes preferably having approximately a semi-spherical shape and with the exposed face or head of greater diameter than the cross sectional diameter of the shanks of said electrodes, and with an annular line of junction between the exposed face of the electrode and the meeting face of the supporting member greater than the diameter of said shanks. Interrupter electrodes of such general outline and proportion appear to be regularly alternately in contact with the electrolyte and insulated therefrom by a gaseous envelop, uniformly over the whole exposed surface of the electrodes, and the gaseous envelops appear to burst or free themselves as a whole from the electrodes, whereby uniform sharp or sudden interruptions are produced. Also either by reason of the cooling effect of the electrolyte and its ready access to the interrupter electrodes after each explosion or interruption, or by reason of the form and proportions of the electrodes, excessive or corrosive heating and corrosive chemical action are avoided. It is believed that the form of the interrupter electrodes and their upwardly facing position has much to do with the successive gaseous envelops being each detached as a whole instead of in the form of a string or series of minute bubbles.

Figs. 2 to 5 illustrate several modifications of my improved interrupter electrode and conductor leading thereto. In Fig. 2 a cylindrical head 20 is formed integral with a shank 21 of less cross-sectional diameter than the head. The head seats closely against the upper end of the supporting member 7 and the shank closely fits and is fused or sealed into the upper portion 22 of the central opening through the supporting member 7. The head and upper portion of the shank are preferably of platinum, while the lower portion of the shank may be of less expensive metal. In practice the sharp upper edges of the cylindrical head are more readily attacked, so that the head tends to assume a semi-spherical outline.

In Fig. 3 a spherical head 24 and integral shank 25 of less cross-sectional diameter than the head are illustrated. The lower portion of the head is seated in a cup shaped recess in the upper end of the supporting member 7' and the shank is sealed into the upper portion of the supporting member. The lower portion of the shank is reinforced by a sleeve $k$ of base metal such as solder for instance.

As illustrated in Fig. 4 the head 28 is semi-spherical at the top and tapered from its greatest diameter horizontally to a shank 29 of less diameter than the head, which is sealed into the insulating stem, or supporting member $7^a$. In Fig. 5 I have shown a head 30 which is cylindrical in outline and has a threaded recess by means of which it is detachably connected to the upper threaded end of the shank 31, which is sealed into the supporting member $7^b$. Heads of spherical or other outline may be detachably connected to the shanks if desired.

The downwardly projecting flange 4 of the cell is designed to seat in a cup shaped depression in the cell supporting member 5 and is provided with a projection 33 to be set so as to register with a pointer 34 on the member 5, which enables the cell to be placed so that the lower ends of the several interrupted electrodes will enter and dip into the respective mercury cups 35 and electrically connect said electrodes with the line wires. A dilute sulfuric acid may be employed as an electrolyte.

The shoulder formed as in Fig. 2 at 40 for instance by reason of the head being of greater diameter than the shank of the electrode, has an important effect in preventing any corrosive action on the supporting member from running backwardly along the shank and so forming a funnel shaped opening or recess about the shank.

Connections other than the mercury cups 35 may be employed if desired.

While I prefer to fuse the shank of the electrode into the supporting stem, other means may be employed to form a tight joint between the electrode and supporting member so as to prevent corrosive action on the supporting member.

The apparatus herein illustrated and described is capable of considerable modification without departing from the principle of my invention.

Having described my invention, what I claim is:

1. In an electrolytic interrupter, a cell containing an electrolyte, an interrupter electrode comprising a supporting member of non-conducting material projecting into said electrolyte, an electrode having a substantially semi-spherical upwardly turned face in contact with the electrolyte, and a conducting shank leading downwardly from said upwardly turned face and sealed into said supporting member.

2. In an electrolytic interrupter, a cell containing an electrolyte, an interrupter electrode comprising a supporting member of non-conducting material seated in an orifice through the lower portion of the cell wall and projecting into the electrolyte, an electrode having a substantially semi-spherical upwardly turned face in contact with the electrolyte, and a conducting shank leading downwardly through and closing a perforation through said supporting member.

3. In an electrolytic interrupter, a cell containing an electrolyte, an interrupter electrode comprising a supporting member of non-conducting material projecting upwardly into said electrolyte, an electrode having a head located at the upper end of said supporting member and in contact with the electrolyte, and a conducting shank of less diameter than the head leading from said head through and sealed into said supporting member.

4. In an electrolytic interrupter, a cell containing an electrolyte, an interrupter electrode comprising a supporting member of non-conducting material seated in an orifice through the cell wall below the surface of said electrolyte, a packing ring and a nut threaded to said supporting member to seal said supporting member in place, and an electrode seated in a perforation through said supporting member and exposing a restricted face to the electrolyte.

5. In an electrolytic interrupter, a cell containing an electrolyte, an interrupter electrode comprising a supporting member passing through an orifice in the lower portion of the cell wall and having a threaded shank projecting outside the cell wall, a packing member to seal the joint between said supporting member and the cell wall, a nut engaging said threaded shank to clamp said supporting member and packing member in position relative to said cell, and an electrode sealed into said supporting member and exposing a restricted upturned area to the electrolyte.

6. An electrolytic interrupter comprising a cell to contain an electrolyte having openings at the top and bottom to receive electrodes, an electrode supported through said upper cell opening, and an interrupter electrode comprising a supporting member of non-conducting material seated in and forming a close joint with said orifice in the lower portion of the cell, an electrode passing through and sealed into an orifice in said supporting member and exposing only an upturned surface of limited area to the electrolyte of said cell.

7. An electrolytic interrupter comprising a cell containing an electrolyte, an electrode projecting downwardly through said upper cell opening and having a downwardly projecting face exposed to the electrolyte, and an interrupter electrode comprising a supporting member of non-conducting material seated in and forming a close joint with said orifice in the lower portion of the cell, an electrode passing through and sealed into an orifice in said supporting member and exposing an upturned surface of limited area to the electrolyte of said cell.

8. In an electrolytic interrupter, a supporting member of insulating material to be seated in an orifice in the lower portion of the cell wall and having a threaded shank projecting outside the cell wall, packing members located upon opposite sides of the cell wall, a nut engaging said threaded shank to lock said supporting member and packing members in place relative to the cell, and an electrode passing through and sealed into an orifice in said supporting member and exposing an upturned face of limited area to the electrolyte of said cell.

In testimony whereof I have affixed my signature in presence of two witnesses.

JOHN ROBERT KELLEY.

Witnesses:
E. W. McCallister,
C. W. Miles.